US012424400B2

(12) United States Patent
Von Allmen et al.

(10) Patent No.: US 12,424,400 B2
(45) Date of Patent: Sep. 23, 2025

(54) ACTUATING MECHANISM FOR OPERATING A CIRCUIT BREAKER

(71) Applicant: General Electric Technology GmbH, Baden (CH)

(72) Inventors: Peter Von Allmen, Oberentfelden (CH); Marius Gacond, Oberentfelden (CH); Martin Walt, Oberentfelden (CH)

(73) Assignee: GE VERNOVA INFRASTRUCTURE TECHNOLOGY LLC, Greenville, SC (US)

(*) Notice: Subject to any disclaimer, the term of this patent is extended or adjusted under 35 U.S.C. 154(b) by 196 days.

(21) Appl. No.: 18/248,040

(22) PCT Filed: Oct. 5, 2021

(86) PCT No.: PCT/EP2021/077436
§ 371 (c)(1),
(2) Date: Apr. 5, 2023

(87) PCT Pub. No.: WO2022/074000
PCT Pub. Date: Apr. 14, 2022

(65) Prior Publication Data
US 2023/0411090 A1 Dec. 21, 2023

(30) Foreign Application Priority Data
Oct. 6, 2020 (EP) .................................... 20200352

(51) Int. Cl.
*H01H 33/34* (2006.01)
*H01H 33/40* (2006.01)
*H01H 33/30* (2006.01)

(52) U.S. Cl.
CPC ............ *H01H 33/34* (2013.01); *H01H 33/40* (2013.01); *H01H 2033/308* (2013.01)

(58) Field of Classification Search
CPC .. H01H 33/34; H01H 33/40; H01H 2033/308; H01H 33/30
(Continued)

(56) References Cited

U.S. PATENT DOCUMENTS 3,492,922 A 2/1970 Van Sickle
4,387,280 A 6/1983 Iman
(Continued)

FOREIGN PATENT DOCUMENTS

DE 1690002 A1 1/1971
DE 3447132 A1 7/1986

OTHER PUBLICATIONS

Extended European Search Report in EP20200352.1 dated Mar. 18, 2021 (7 pages).
(Continued)

*Primary Examiner* — Lheiren Mae A Caroc
(74) *Attorney, Agent, or Firm* — Eversheds Sutherland (US) LLP

(57) ABSTRACT

An actuating mechanism for a circuit breaker includes a first piston movable in a first cylinder, against the force of a first compressible member, by admitting hydraulic fluid, and a second piston movable in a second cylinder, against the force of a second compressible member, by admitting hydraulic fluid. Hydraulic fluid can transferred from the second cylinder into the first cylinder via an interconnecting fluid passage, and released from the first cylinder via an outlet fluid passage. The first piston is arranged to be connected to a circuit breaker in a switchgear so as to open and close it. Importantly, the first piston is directly mechanically connected to the first compressible member, ensuring that all the energy stored in the compressible member is available to open the circuit breaker.

15 Claims, 4 Drawing Sheets

(58) Field of Classification Search
USPC ............................................. 200/82 R–82 E
See application file for complete search history.

(56) References Cited

U.S. PATENT DOCUMENTS 5,750,950 A * 5/1998 Nogami ................ H01H 33/34
218/154
5,804,787 A * 9/1998 Daimon ................ H01H 33/34
218/84

OTHER PUBLICATIONS

International Search Report and Written Opinion in PCT/EP2021/077436 dated Jan. 21, 2022 (11 pages).

* cited by examiner

ACTUATING MECHANISM FOR OPERATING A CIRCUIT BREAKER

TECHNICAL FIELD

The invention relates to the field of high-voltage circuit breakers for switchgears. More particularly, the invention relates to an actuating mechanism for a circuit breaker in a switchgear. The invention also relates to a method of operating a circuit breaker.

PRIOR ART

Actuating mechanisms for high-voltage (HV) circuit breakers are well-known. These often take the form of (purely) mechanical devices having numerous components, such as gears, levers, springs, cam, freewheels etc., which carry high loads and have complex movement, making them prone to failure. Attempts to make these components stronger has been met with limited success, as the cost of new or lighter materials is generally prohibitive, and so they often end up heavier and in turn require more energy to operate the circuit breaker. There is also the matter of the actuating mechanism being susceptible to corrosion being made largely of metal. Maintenance of such mechanical actuating mechanisms is therefore expensive.

Hydraulic actuating mechanisms are also known. These typically possess a piston for opening and closing the circuit breaker, the piston deriving its energy through hydraulic fluid passages from an accumulator. Hydraulic actuating mechanisms not only allow large loads to be developed and transmitted, they generally have fewer components and less complex movement compared to their mechanical counterparts. Unfortunately however, a leak in the hydraulic fluid passage may cause a loss of energy being transferred from the accumulator, meaning that the actuating mechanism is unable to open the circuit breaker or may open it too slowly, which could be dangerous.

As such, there is a need for an actuating mechanism for a circuit breaker which is reliable, has a lower part count and less complex movement, and is cheaper.

BRIEF DESCRIPTION OF THE INVENTION

The present invention relates to an actuating mechanism for a circuit breaker comprising an opening accumulator comprising a first piston, a first cylinder and a first compressible member, the first piston being movable in the first cylinder, against the force of the first compressible member, from a discharged position to a charged position by admitting hydraulic fluid, and movable to return, under the force of the first compressible member, to the discharged position by releasing the hydraulic fluid, wherein the first piston is directly mechanically connected to the first compressible member, and wherein the first cylinder is connected to an outlet fluid passage which can be opened and closed, the actuating mechanism further comprising a closing accumulator comprising a second piston, a second cylinder and a second compressible member, the second piston being movable in the second cylinder, against the force of the second compressible member, from a discharged position to a charged position by admitting hydraulic fluid, and to return, under the force of the second compressible member, to the discharged position by releasing the hydraulic fluid, wherein the first cylinder and the second cylinder are connected by an interconnecting fluid passage which can be opened and closed, arranged such that when the outlet fluid passage is closed and the interconnecting fluid passage is opened, hydraulic fluid released from the second cylinder will be admitted into the first cylinder to move the first piston to the charged position.

The present invention also relates to a method of operating the abovementioned actuating mechanism.

Preferable features of the invention are defined in the appendant claims.

BRIEF DESCRIPTION OF THE FIGURES

The invention will be better understood when reading the following detailed description and non-limiting examples, as well as studying the figures, wherein.

In all of these figures, identical references can designate identical or similar elements. In addition, the various portions shown in the figures are not necessarily shown according to a uniform scale, in order to make the figures more legible.

DETAILED DESCRIPTION OF PARTICULAR EMBODIMENTS

Figure 1:
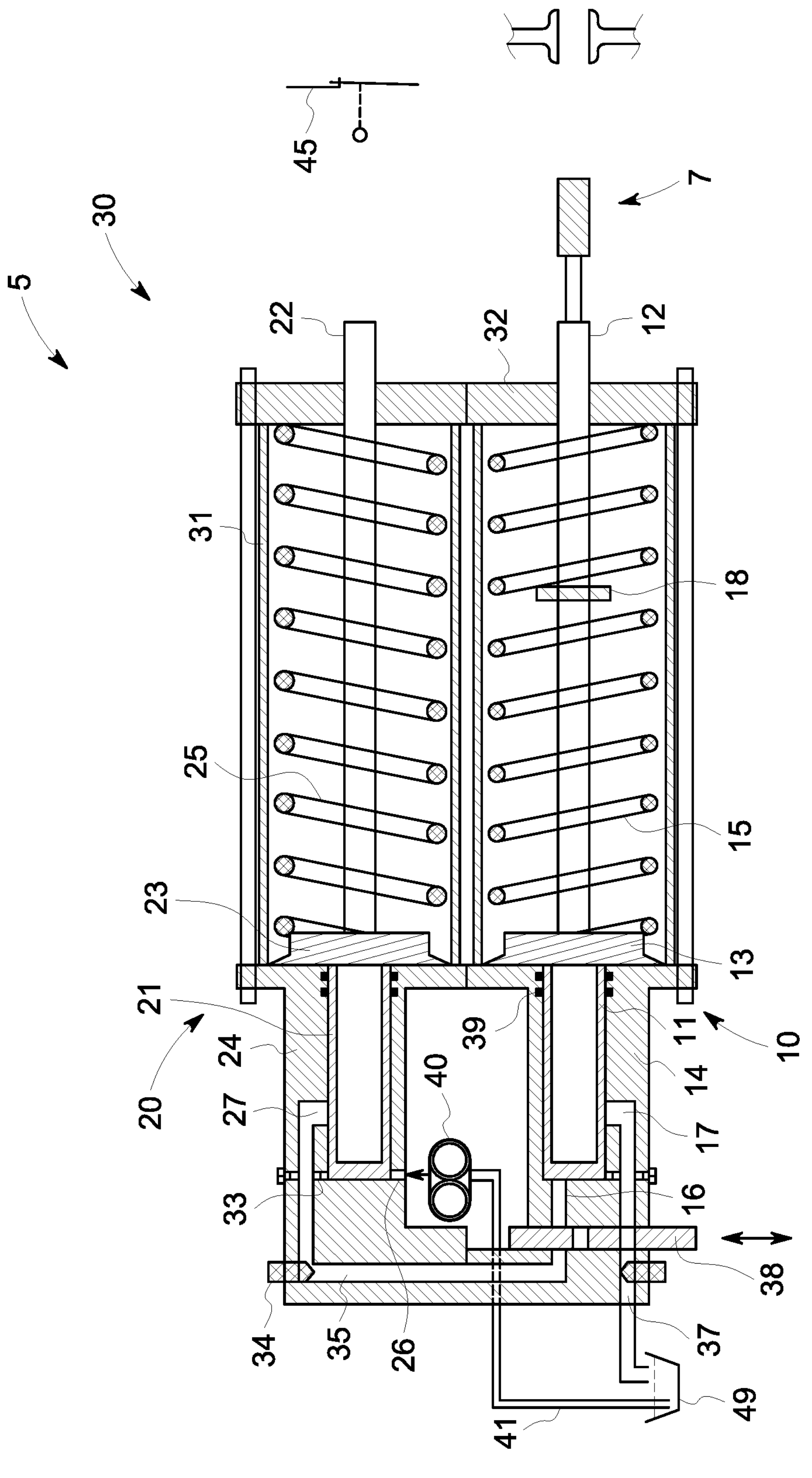
FIG. 1 shows a cross-section view of an actuating mechanism for a circuit breaker according to a preferred embodiment of the invention, with the first piston and the second piston in the discharged position.

FIGS. 1-4 show an actuating mechanism 30 for a high-voltage (HV) circuit breaker 7 according to a preferred embodiment of the invention in various states of operation. It is connected, as shown in a rather simplified manner, to a circuit breaker 7 of a switchgear 5. Referring initially to FIG. 1, the actuating mechanism 30 comprises an opening accumulator 10 and a closing accumulator 20. The opening accumulator 10 comprises a first piston 11, a first cylinder 14 and a first spring 15, with the first piston 11 slidably mounted in the first cylinder 14 and movable between a discharged position (shown in FIG. 1) and a charged position (shown in FIG. 3).

The first piston 11 further comprises a first piston rod 12. When the first piston 11 is in the charged position, the first piston 11 and the first piston rod 12 are extended, and when the first piston 11 is in the discharged position, the first piston 11 and the first piston rod 12 are retracted. The first piston 11 also comprises a first flange 13 for receiving a spring.

The first spring 15 exerts an axial force on the first piston 11, urging it towards the discharged position (shown in FIG. 1). It acts through the first flange 13 on which the first spring 15 sits. The first piston 11 is directly mechanically connected to the first spring 15. Movement of the first piston 11 towards the charged position causes the first spring 15 to be compressed, and the resulting force acting on the first piston 11 to increase.

The first cylinder 14 comprises an inlet 16 and an outlet 17 for admitting and releasing hydraulic fluid respectively. When hydraulic fluid is admitted into the first cylinder 14, hydraulic pressure is applied to the first piston 11 and it moves to the charged position, against the force of the first spring 15. Equally, when the hydraulic fluid is released from the first cylinder 14, hydraulic pressure is removed from the first piston 11 and it moves to return to the discharged position, under the force of the first spring 15. The first piston 11 is arranged to be directly mechanically connected to the circuit breaker 7.

The actuating mechanism 30 also comprises a closing accumulator 20. In so far as the features above are concerned, it is near identical to the opening accumulator 10, the main difference in this particular embodiment being that it comprises a stiffer spring 25. For completeness, the closing accumulator 20 will also be described here.

Figure 2:
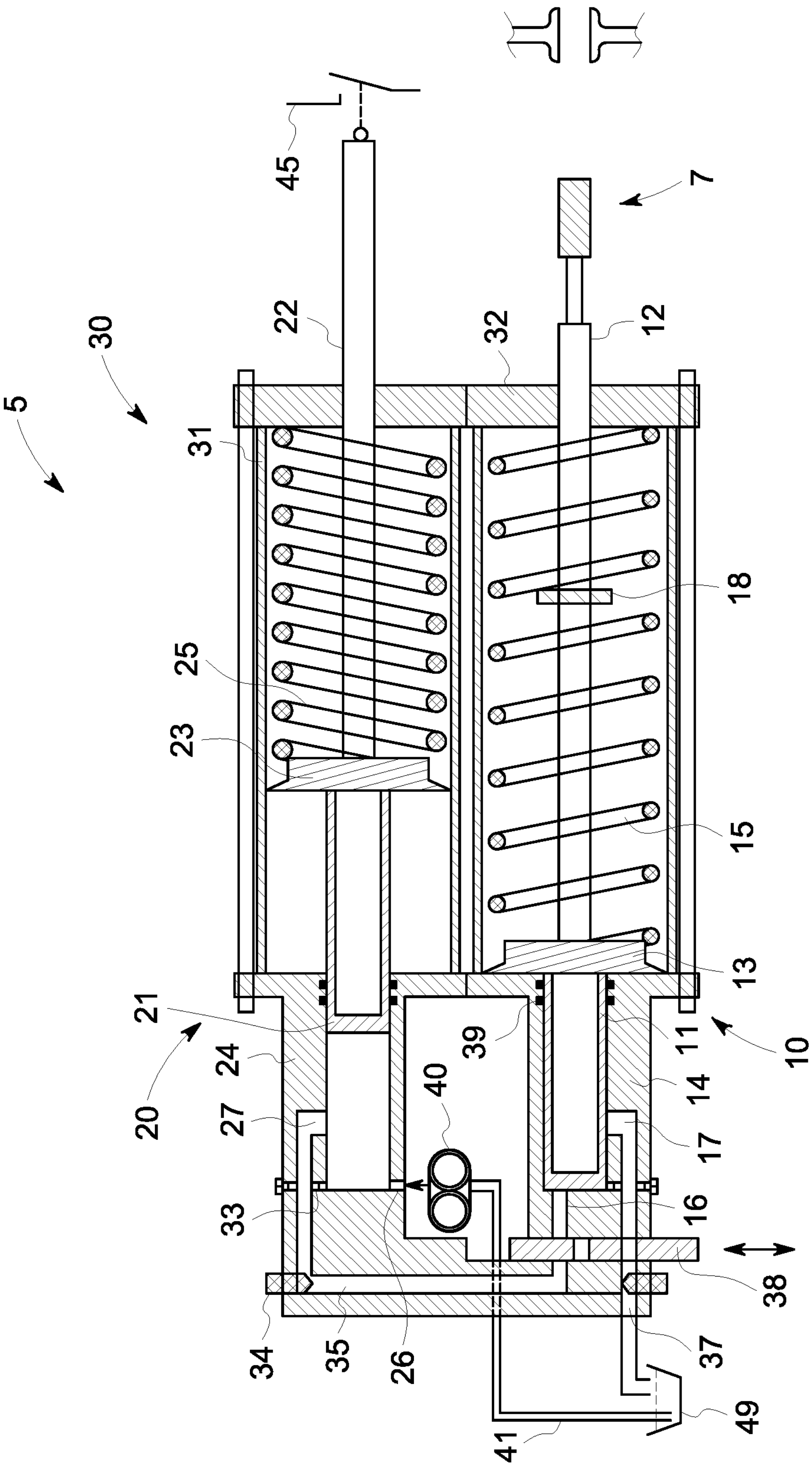
FIG. 2 shows a cross-section view of the same actuating mechanism, with the first piston in the discharged position and the second piston in the charged position.

The closing accumulator 20 comprises a second piston 21, a second cylinder 24 and a second spring 25, with the second piston 21 slidably mounted in the second cylinder 24 and movable between a discharged position (shown in FIG. 1) and a charged position (shown in FIG. 2).

The second piston 21 further comprises a second piston rod 22. When the second piston 21 is in the charged position, the second piston 21 and the second piston rod 22 are extended, and when the second piston 21 is in the discharged position, the second piston 21 and the piston rod 22 are retracted. The second piston 21 also comprises a second flange 23 for receiving a spring.

The second spring 25 exerts an axial force on the second piston 21, urging it towards the discharged position (shown in FIG. 1). It acts through the second flange 23 on which the second spring 25 sits. As much as possible, the second piston 21 is also directly mechanically connected to the second spring 25 (which is shown in the figures). Movement of the second piston 21 towards the charged position causes the second spring 25 to be compressed, and the resulting force acting on the second piston 21 to increase.

The second cylinder 24 comprises an inlet 26 and an outlet 27 for admitting and releasing hydraulic fluid respectively. When hydraulic fluid is admitted into the second cylinder 24, hydraulic pressure is applied to the second piston 21 and it moves to the charged position, against the force of the second spring 25. Equally, when the hydraulic fluid is released from the second cylinder 24, hydraulic pressure is removed from the second piston 21 and it moves to return to the discharged position, under the force of the second spring 25.

A pump 40 is provided on an inlet fluid passage 41 connected to the inlet 26 of the second cylinder 24. When the pump 40 is activated, hydraulic fluid is pumped into the second cylinder 24. When it is deactivated, hydraulic fluid is not pumped into the second cylinder 24.

A pump switch 45 is provided for operating the pump 40. It is arranged to remain switched on unless acted on by a force. For example, the pump switch 45 may comprise a spring urging it closed. This pump switch 45 is provided at a location where the second piston rod 22 does not act on the pump switch 45 unless it is in the extended position where it pushes the pump switch 45 open to switch it off. In other words, hydraulic fluid is pumped into the second cylinder 24 whenever the second piston 21 is not in the charged position. A reservoir 49 with hydraulic fluid is provided from which the pump 40 can draw hydraulic fluid and to which hydraulic fluid can be returned.

An interconnecting fluid passage 35 connects the outlet 27 of the second cylinder 24 and the inlet 16 of the first cylinder 14. It allows the hydraulic fluid released from the second cylinder 24 to be admitted into the first cylinder 14. As alluded to before, the hydraulic pressure in the second cylinder 24 when the second piston 21 is in the charged position is higher than that of the first cylinder 14 when the first piston 11 is in the discharged position. When the interconnecting fluid passage 35 is opened, second piston 21 will move to the discharged position, pumping the hydraulic fluid into the first cylinder 14 and moving the first piston 11 to the charged position. This pressure differential is realised by the second spring 25 being stiffer than the first spring 15.

Although the first spring 15 and the second spring 25 are of the coil spring type, it will be appreciated that other types of springs may be employed, such as bellow springs. It will equally be appreciated that while first compressible member is ideally a spring, this may not always be the case. The same applies to the second compressible member. It should also be noted that 'compressible members' are mechanical in nature and do not include 'compressible fluid' devices such as nitrogen accumulators.

A valve 38 is provided, located on the interconnecting fluid passage 35. It is also located on an outlet fluid passage 37, which connects the outlet 17 of the first cylinder 14 to the hydraulic fluid reservoir 49. It is arranged to open and close the interconnecting fluid passage 35 and the outlet fluid passage 37 in opposite fashion. This valve 38 can be selectively operated to open and close the circuit breaker 7. In FIG. 1, the valve 38 is in the open position, i.e. corresponding to the circuit breaker 7 being open, while in FIG. 3, it is in the closed position, i.e. corresponding to the circuit breaker 7 being closed. In the open position, hydraulic fluid can flow through the outlet fluid passage 37 but not through the interconnecting fluid passage 35, and in the closed position, hydraulic fluid can flow through the interconnecting fluid passage 35 but not the outlet fluid passage 37. It will be understood that other valve arrangements are possible, for example, a separate valve on each of the interconnecting fluid passage 35 and the outlet fluid passage 37.

The first piston 11 will now be discussed in further detail. As mentioned above, first spring 15 exerts a force on the first piston 11 via the first flange 13. There is therefore a direct mechanical connection between the first spring 15, i.e. the energy storage device of the opening accumulator 10, and the first piston 11, and not a fluidic connection/hydraulic passage between the two. In use, the first piston 11 will be directly mechanically connected to the circuit breaker 7, typically through its piston rod 12. This represents a direct mechanical connection between the first spring/compressible member 15 and the circuit breaker 7. It is further intended that the first piston 11 in use be connected to the circuit breaker 7 such that when the first piston 11 is in the charged position, the circuit breaker 7 is closed, and when it is in the discharged position, the circuit breaker 7 is open.

Therefore, when the first piston 11 is in the charged position, the compressed first spring 15 stands ready to directly mechanically transfer its energy to the first piston 11 to open the circuit breaker 7. Crucially, the energy for opening the circuit breaker 7 is not transferred through a fluidic connection/hydraulic passage as in the prior art, which as mentioned earlier may be prone to leak.

The actuating mechanism 30 has a housing 31 within which are located the opening accumulator 10 and the closing accumulator 20, in parallel orientation. The first cylinder 14 and second cylinder 24 are provided near one axial end of the housing 31. The first piston 11 and second piston 21 are located in their respective cylinders, although the first piston rod 12 and second piston rod 22 protrude from the housing 31 at an opposing axial end, in particular from an end wall 32 of the housing 31. The interconnecting fluid passage 35 is also located in the housing 31. The first spring 15 and second spring 25 are respectively mounted around the first piston rod 12 and second piston rod 22, between the end wall 32 of the housing 31 and the respective first flange 13 and second flange 23. At least the first piston rod 12 is provided with a stop 18, located within the housing 31, for engaging the end wall 32 and preventing it moving beyond the charged position. The housing 31 may further house the pump 40 and the outlet fluid passage 37.

In this preferred embodiment, the pressure differential across the interconnecting fluid passage 35 is realised by the second spring 25 being stiffer than the first spring 15. However, it will be appreciated that other arrangements may allow the same effect. For example, the first and second cylinders 14, 24 may be of different sizes or cross-sectional area, or the first and second compressible members 15, 25 may be preloaded differently, etc. The important thing is that hydraulic fluid released from the second cylinder 24 is able to move the first piston 11 to the charged position.

The actuating mechanism 30 may of course comprise other features known in the field. For example, O-rings 39 are provided at the mouth of the cylinders 14, 24 so that they seal against their pistons 11, 21 and prevent hydraulic fluid leaking out. Damping valves 33 may be provided to slow the pistons 11, 21 as they approach the discharged position. Flow adjustment valves 34 may be provided in the various fluid passages 35, 37 to adjust the opening and closing operation speed of the circuit breaker.

The terms 'charged position' and 'discharged position' of the pistons used in the foregoing correspond to whether energy has been respectively stored or released from their springs. Meanwhile, the terms 'opening accumulator' and 'closing accumulator' correspond to the actuating operation they conduct on the circuit breaker when their stored energy is released.

To facilitate understanding of the invention, the operation of the actuating mechanism in the context of a circuit breaker 7 in a switchgear 5 will be briefly discussed, with reference to FIGS. 1-4. The first piston 11 is directly mechanically connected to the circuit breaker 7 and such that in the charged position the circuit breaker 7 is closed and in the discharged position the circuit breaker 7 is open.

In FIG. 1, the actuating mechanism 30 is in the initial position. The first piston 11 and the second piston 21 are in the discharged position, while the circuit breaker 7 is in the open position. We note that the pump switch 45 is in the closed position. The pump 40 is therefore activated and pumps hydraulic fluid through inlet fluid passage 41 from the reservoir 49 into the second cylinder 24. We note that the valve 38 is in the open position, and so the interconnecting fluid passage 35 is closed, meaning that hydraulic fluid being admitted into the second cylinder 24 is prevented from being released, and thus begins filling (or 'charging') the second cylinder 24. As a result, the second piston 21 moves from its discharged position towards the charged position and compresses the second spring 25. At the same time, the piston rod 22 of the second piston 21 extends towards the pump switch 45.

FIG. 2 shows the state where the second piston 21 is in the charged position. The second piston rod 22 has pushed the pump switch 45 to switch it off, thereby deactivating the pump 40. The second spring 25 maintains the hydraulic pressure in the second cylinder 24. The circuit breaker 7 is presently still in the open position.

When the circuit breaker 7 is to be closed, the valve 38 is moved to the closed position. This opens the interconnecting fluid passage 35, allowing hydraulic fluid to be released from the second cylinder 24 under the force of the second spring 25. The hydraulic fluid flows through the interconnecting fluid passage 35, and is admitted into the first cylinder 14. Concurrently, the valve 38 has closed the outlet fluid passage 37, meaning that the hydraulic fluid admitted into the first cylinder 14 is prevented from being released, and thus begins filling the first cylinder 14.

As the second spring 25 is stiffer than the first spring 15 and is compressed, the hydraulic pressure in the second cylinder 24 is higher than that of the first cylinder 14. The second piston 21 thus moves rapidly to the discharged position, causing in turn the first piston 11 to move rapidly to the charged position and the first piston rod 12 to extend to move the circuit breaker 7 from the open position to the closed position, thereby allowing current to flow from the switchgear 5 to the grid.

Figure 3:
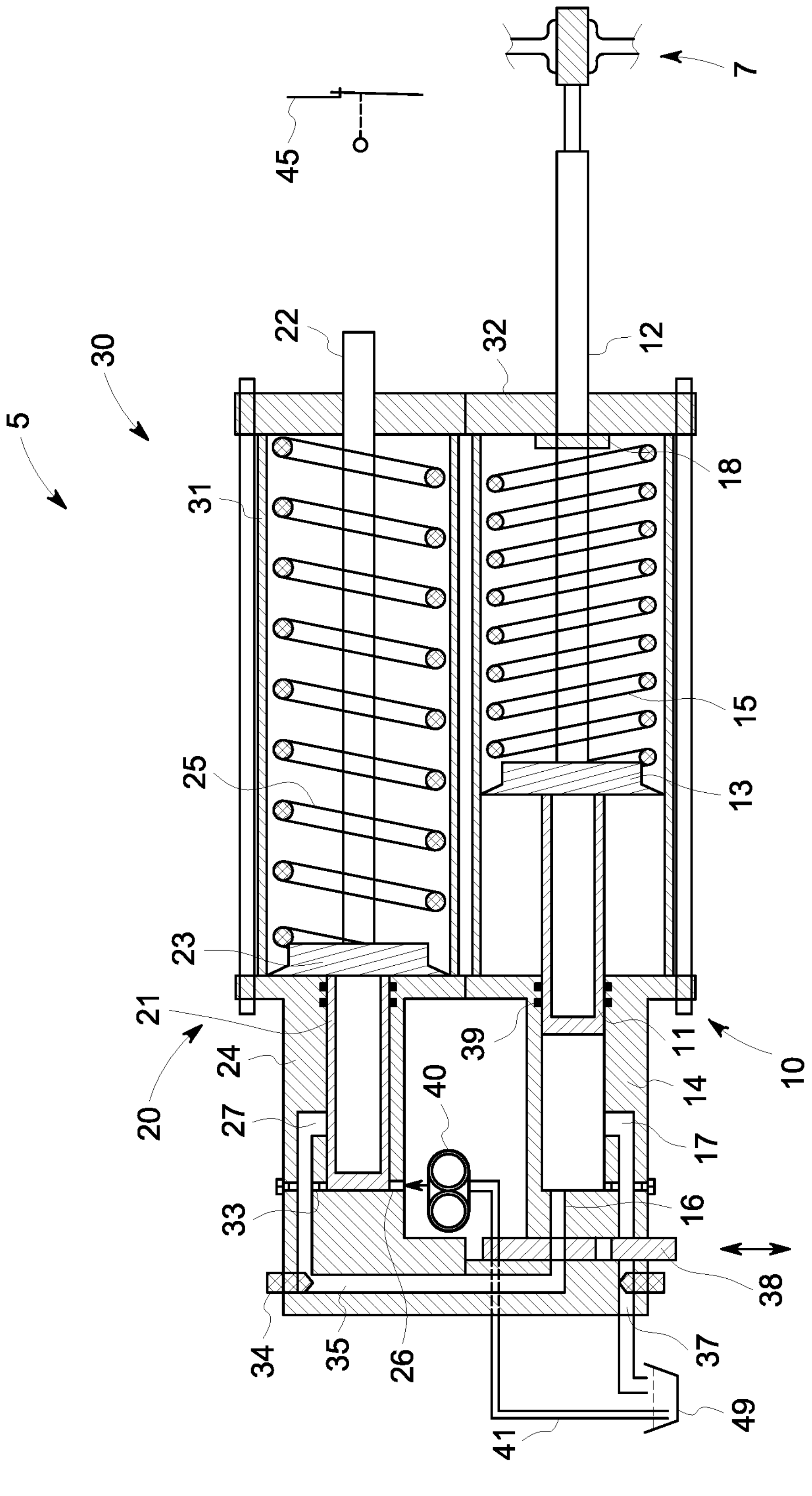
FIG. 3 shows a cross-section view of the same actuating mechanism, with the first piston in the charged position and the second piston in discharged position.

FIG. 3 shows the actuating mechanism 30 (just) after the circuit breaker 7 has been closed. With the second piston 21 now in the discharged position, the pump switch 45 is switched on, meaning the pump 40 is activated and begins pumping hydraulic fluid into the second cylinder 24 again until the second piston 21 reaches the charged position. We note that the stop 18 on the first piston 11 is engaged with the end wall 32 of the housing, which prevents the first piston 11 moving beyond its charged position. Limiting the stroke of the first piston 11 in this way not only allows the second cylinder 24 to be filled without moving the first piston 11, it also defines the stroke of the first piston 11 allowing precise control of the of the circuit breaker 7. A stop may optionally be provided on the second piston rod 22 too.

Figure 4:
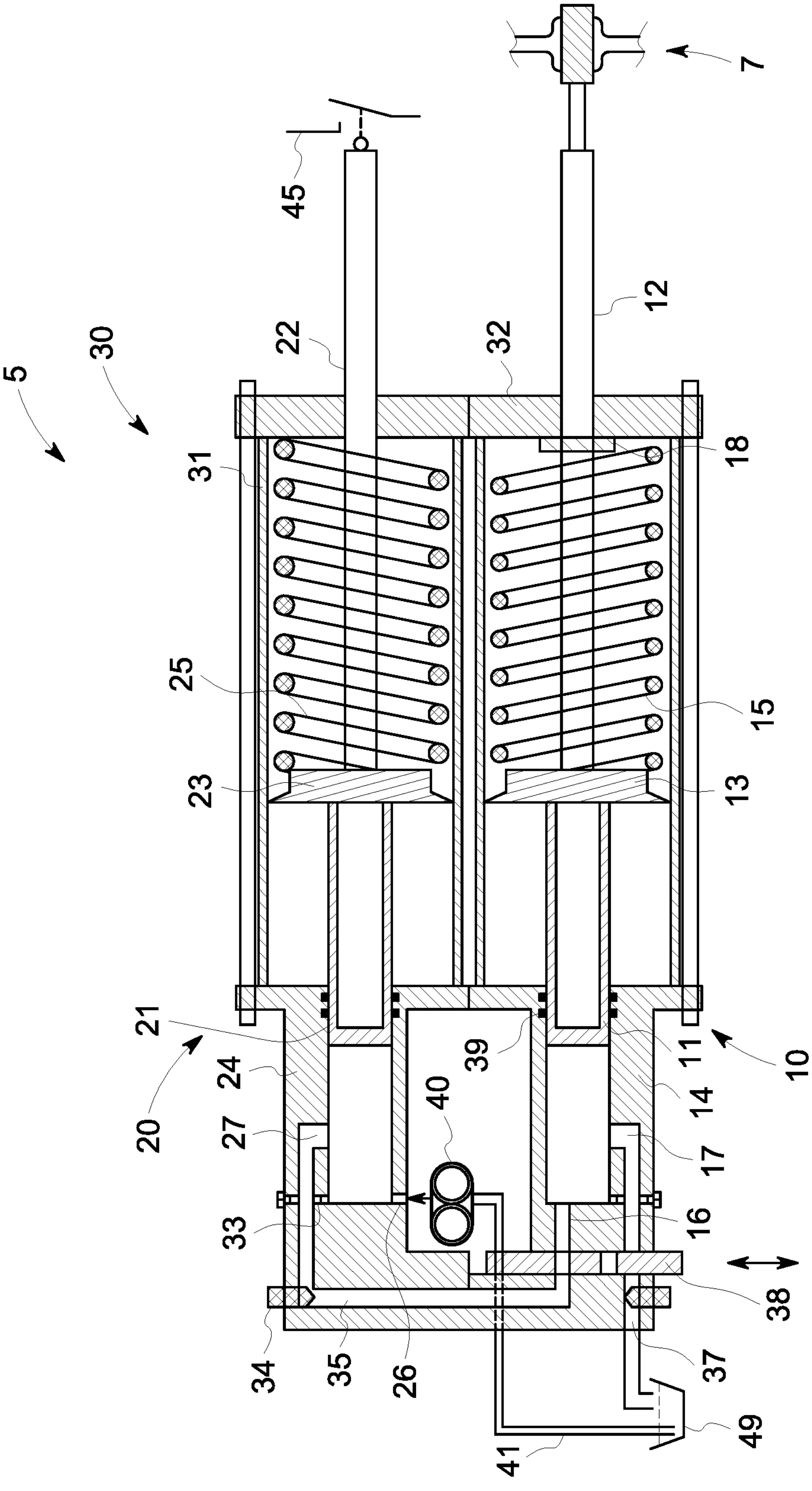
FIG. 4 shows a cross-section view of the same actuating mechanism, with the first piston and the second piston in the charged position.

Finally, FIG. 4 shows the main operational state of the actuating mechanism, wherein the first piston 11 and the second piston 21 are both in the charged position. As can be seen, the circuit breaker 7 is closed, although the first piston 11 is ready to open the circuit breaker 7 if necessary. Meanwhile, the second piston 21 is ready to close the circuit breaker 7 again (should it be opened).

When a fault is detected and the circuit breaker 7 needs to be opened, the valve 38 is moved to the open position. This opens the outlet fluid passage 37 while concurrently closing the interconnecting fluid passage 35, allowing hydraulic fluid to be released from the first cylinder 14 to the reservoir 49. The first piston 11 will rapidly return from the charged position to the discharged position, the energy released from the first spring 15 being directly mechanically transferred to the circuit breaker 7 to open it, with the first piston rod 12 retracting in the process to move the circuit breaker 7 from the closed position to the open position, thereby preventing current from flowing from the switchgear 5 to the grid.

At this point, the actuating mechanism 30 is effectively in the state as shown in FIG. 2, and will typically need to cycle through the states shown in FIG. 3 and FIG. 4 to revert to the main operational state (with the circuit breaker 7 closed).

The present invention provides a unique actuating mechanism which cleverly combines aspects of mechanical actuating mechanisms and hydraulic actuating mechanisms, retaining their advantages while doing away with their disadvantageous.

Like known mechanical actuating mechanisms, the actuation mechanism of the present invention comprises a direct mechanical connection from the compressible member for opening the circuit breaker to the component for operating the circuit breaker. It is however of simpler construction, having far fewer components and less complex movement when compared to known mechanical actuating mechanisms, and as such is less likely to fail and has reduced maintenance cost. By employing hydraulics, large forces can be developed easily, and thus the energy for operating the circuit breaker can readily be provided. Furthermore, it will be appreciated that many of its moving component, in use, are in contact with hydraulic fluid, maintaining them lubricated and mitigating corrosion.

At the same time, the actuating mechanism of the present invention has increased reliability when compared to known hydraulic actuating mechanisms, as there is a greatly reduced risk of the circuit breaker not opening or opening too slowly. Importantly, this actuating mechanism provides a direct mechanical connection from the compressible member to the piston for opening the circuit breaker. All the energy stored in the compressible member can therefore be utilised to open the circuit breaker, ensuring that the circuit breaker can always be opened. This is unlike known hydraulic actuating mechanisms where a leak in the hydraulic passage may cause a loss of energy being transferred to the piston for opening the circuit breaker. This actuating mechanism of the present invention thus has improved reliability and safety.

In one variant of the present embodiment, instead of being compressed when the pistons are in the charged position, the compressible members are provided such that they are stretched when hydraulic fluid is admitted into the cylinders and the pistons are in the charged position. Such a variant can be visualised with the springs of the preferred embodiment being provided within the cylinders and connecting the pistons to the cylinders such that they resist the extension of the pistons. Other modifications will be apparent to the skilled person in light of the disclosure above.

We claim:

1. An actuating mechanism for a circuit breaker comprising an opening accumulator comprising a first piston, a first cylinder and a first compressible member, the first piston being movable in the first cylinder, against a force of the first compressible member, from a discharged position to a charged position by admitting hydraulic fluid, and movable to return, under the force of the first compressible member, to the discharged position by releasing the hydraulic fluid, wherein the first piston is directly mechanically connected to the first compressible member, and wherein the first cylinder is connected to an outlet fluid passage which can be opened and closed, the actuating mechanism further comprising a closing accumulator comprising a second piston, a second cylinder and a second compressible member, the second piston being movable in the second cylinder, against a force of the second compressible member, from a discharged position to a charged position by admitting hydraulic fluid, and to return, under the force of the second compressible member, to the discharged position by releasing the hydraulic fluid, wherein the first cylinder and the second cylinder are connected by an interconnecting fluid passage which can be opened and closed, arranged such that when the outlet fluid passage is closed and the interconnecting fluid passage is opened, hydraulic fluid released from the second cylinder will be admitted into the first cylinder to move the first piston to the charged position.

2. The actuating mechanism according to claim 1, characterised in that the closing accumulator comprises a pump connected to the second cylinder.

3. The actuating mechanism according to claim 2, characterised in that a pump switch for operating the pump is provided, located so as to be engaged by the second piston when the second piston is in the charged position.

4. The actuating mechanism according to claim 3, characterised in that the second piston has a piston rod for engaging the pump switch.

5. The actuating mechanism according to claim 1, characterised in that the first piston and the second piston are each extended when they are in the charged position and retracted when they are in the discharged position.

6. The actuating mechanism according to claim 1, characterised in that the first piston has a piston rod for directly mechanically connecting to the circuit breaker.

7. The actuating mechanism according to claim 1, characterised in that the first compressible member and second compressible member are springs.

8. The actuating mechanism according to claim 1, characterised in that a valve is provided on the interconnecting fluid passage.

9. The actuating mechanism according to claim 8, characterised in that the valve is also provided on the outlet fluid passage, the valve arranged to work in opposite fashion on the outlet fluid passage and the interconnecting fluid passage.

10. The actuating mechanism according to claim 1, characterised in that the actuating mechanism comprises a housing, wherein the opening accumulator, the closing accumulator and the interconnecting fluid passage are provided in the housing.

11. A switchgear comprising a circuit breaker and an actuating mechanism as claimed in claim 1.

12. Method of operating a circuit breaker using the actuating mechanism according to claim 1, the method comprising directly mechanically connecting the first piston to a circuit breaker, and such that in the charged position the circuit breaker is closed and in the discharged position the circuit breaker is open, wherein the method further comprises admitting hydraulic fluid into the second cylinder, while the interconnecting fluid passage is closed, to thereby move the second piston to the charged position, opening the interconnecting fluid passage, releasing hydraulic fluid from the second cylinder and admitting the hydraulic fluid into the first cylinder, while the outlet fluid passage is closed, to thereby move the first piston to the charged position, so as to close the circuit breaker.

13. The method of operating a circuit breaker according to claim 12, the method comprising closing the interconnecting fluid passage and opening the outlet fluid passage, releasing the hydraulic fluid from the first cylinder to thereby move the first piston to the discharged position, so as to open the circuit breaker.

14. The method of operating a circuit breaker according to claim 13, the method further comprising operating a valve to close the interconnecting fluid passage and also to open the outlet fluid passage to release the hydraulic fluid from the first cylinder.

15. An actuating mechanism for a circuit breaker comprising an opening accumulator comprising a first piston, a first cylinder and a first compressible member, the first piston being movable in the first cylinder, against a force of the first compressible member, from a discharged position to a charged position by admitting hydraulic fluid, and movable to return, under the force of the first compressible member, to the discharged position by releasing the hydraulic fluid, wherein the first piston is directly mechanically connected to the first compressible member, and wherein the first cylinder is connected to an outlet fluid passage which can be opened and closed, the actuating mechanism further comprising a closing accumulator comprising a second piston, a second cylinder and a second compressible member, the second piston being movable in the second cylinder, against a force of the second compressible member, from a discharged position to a charged position by admitting hydraulic fluid, and to return, under the force of the second compressible member, to the discharged position by releasing the hydraulic fluid, wherein the first cylinder and the second cylinder are connected by an interconnecting fluid passage which can be opened and closed, arranged such that when the outlet fluid passage is closed and the interconnecting fluid passage is opened, hydraulic fluid released from the second cylinder will be admitted into the first cylinder to move the first piston to the charged position, characterised in that the second compressible member has a higher stiffness than the first compressible member.

* * * * *